June 7, 1955
A. C. JOHNSON
2,710,069
DIRIGIBLE ARTICULATED FRAME GARDEN TRACTOR
Filed June 13, 1949
6 Sheets-Sheet 1
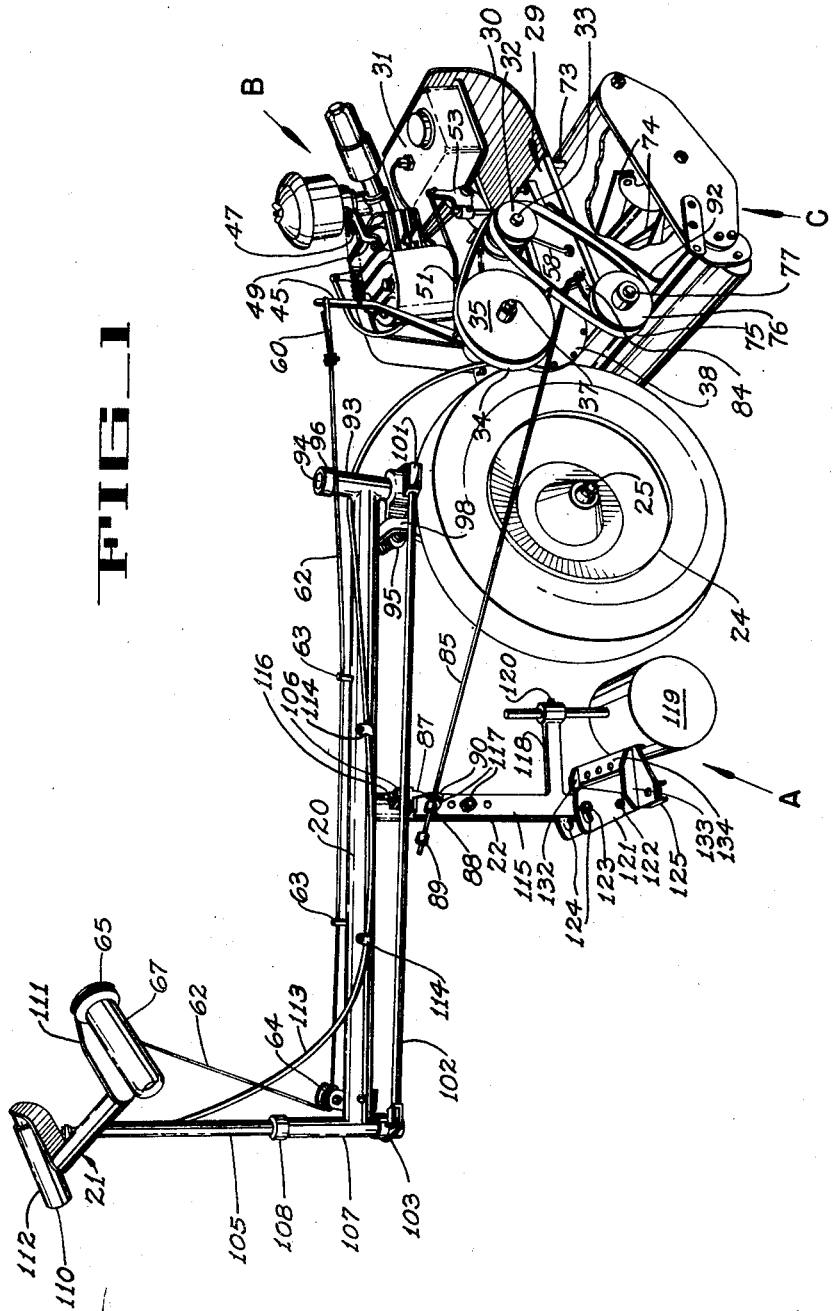
INVENTOR
ALFRED C. JOHNSON
BY *Hans G. Hoffmeister.*
ATTORNEY June 7, 1955 A. C. JOHNSON 2,710,069
DIRIGIBLE ARTICULATED FRAME GARDEN TRACTOR
Filed June 13, 1949 6 Sheets-Sheet 2
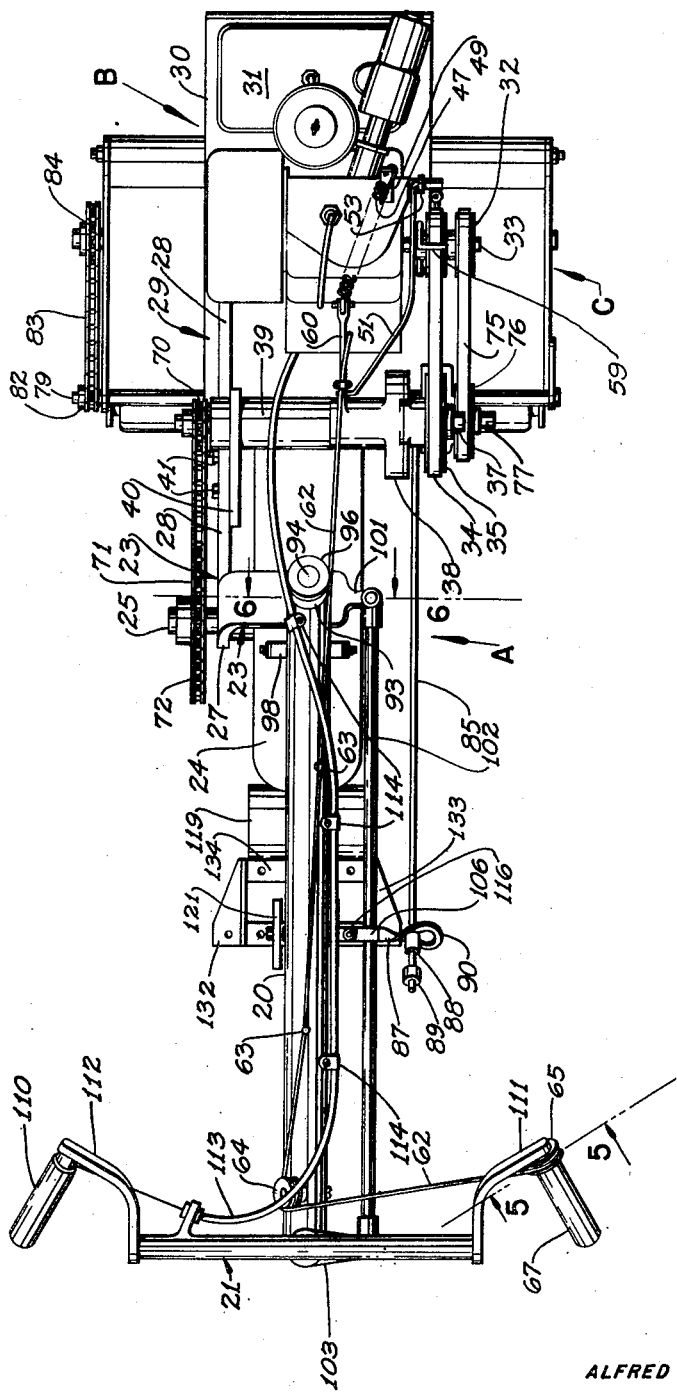
FIG_2
INVENTOR
ALFRED C. JOHNSON
BY Hans G. Hoffmeister
ATTORNEY

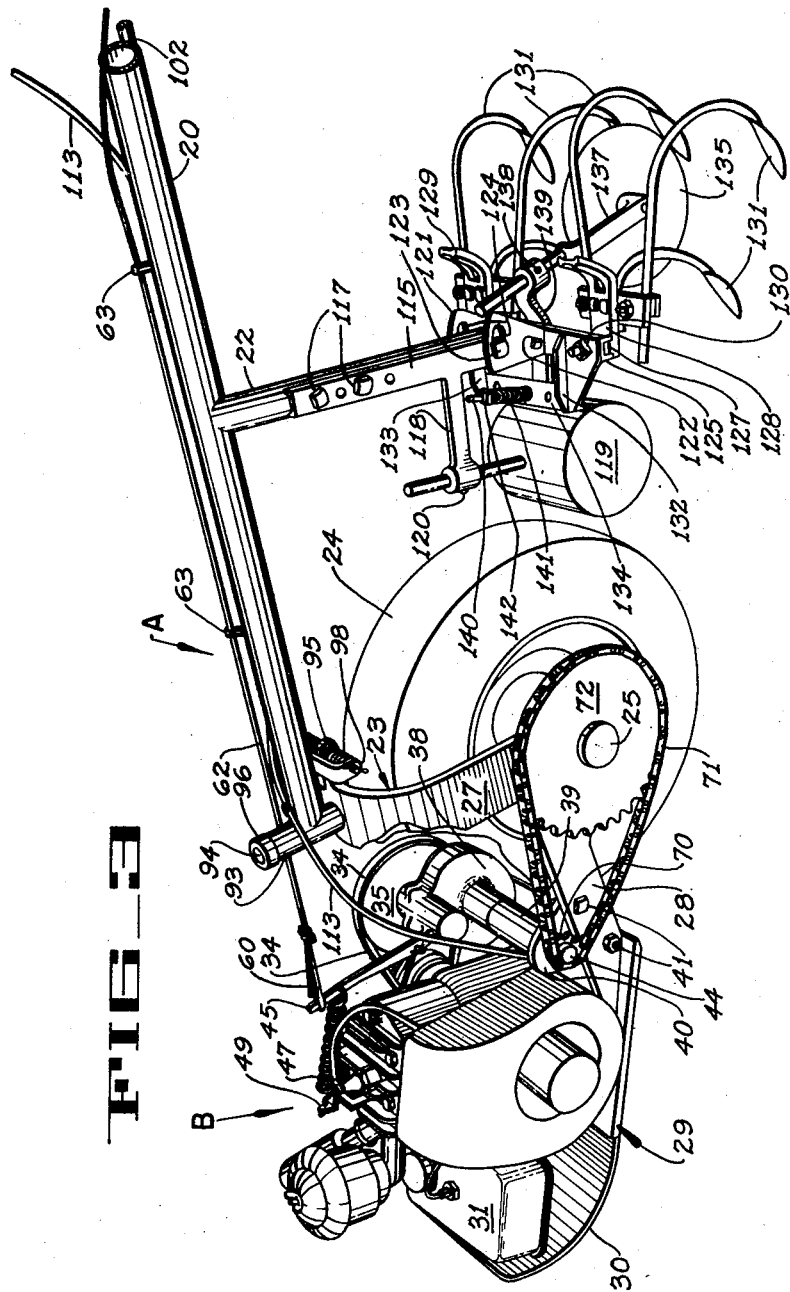

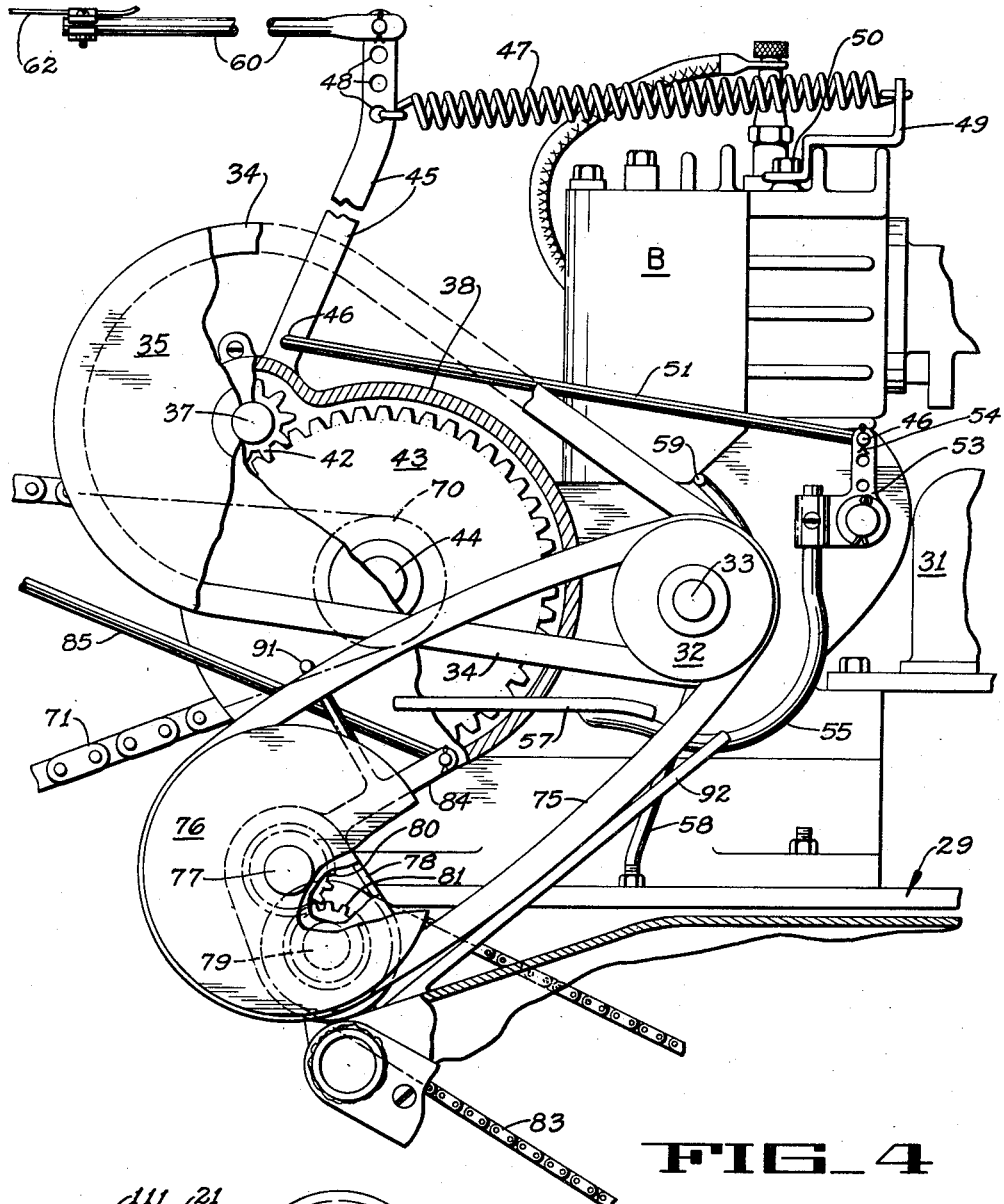
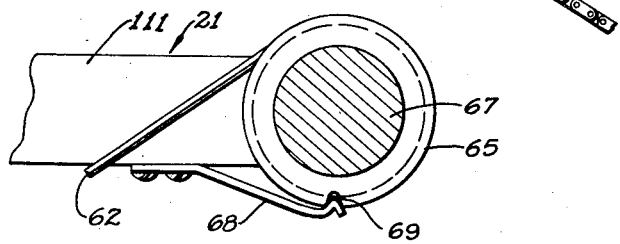
FIG_4
FIG_5
INVENTOR
ALFRED C. JOHNSON
BY Hans G. Hoffmeister
ATTORNEY

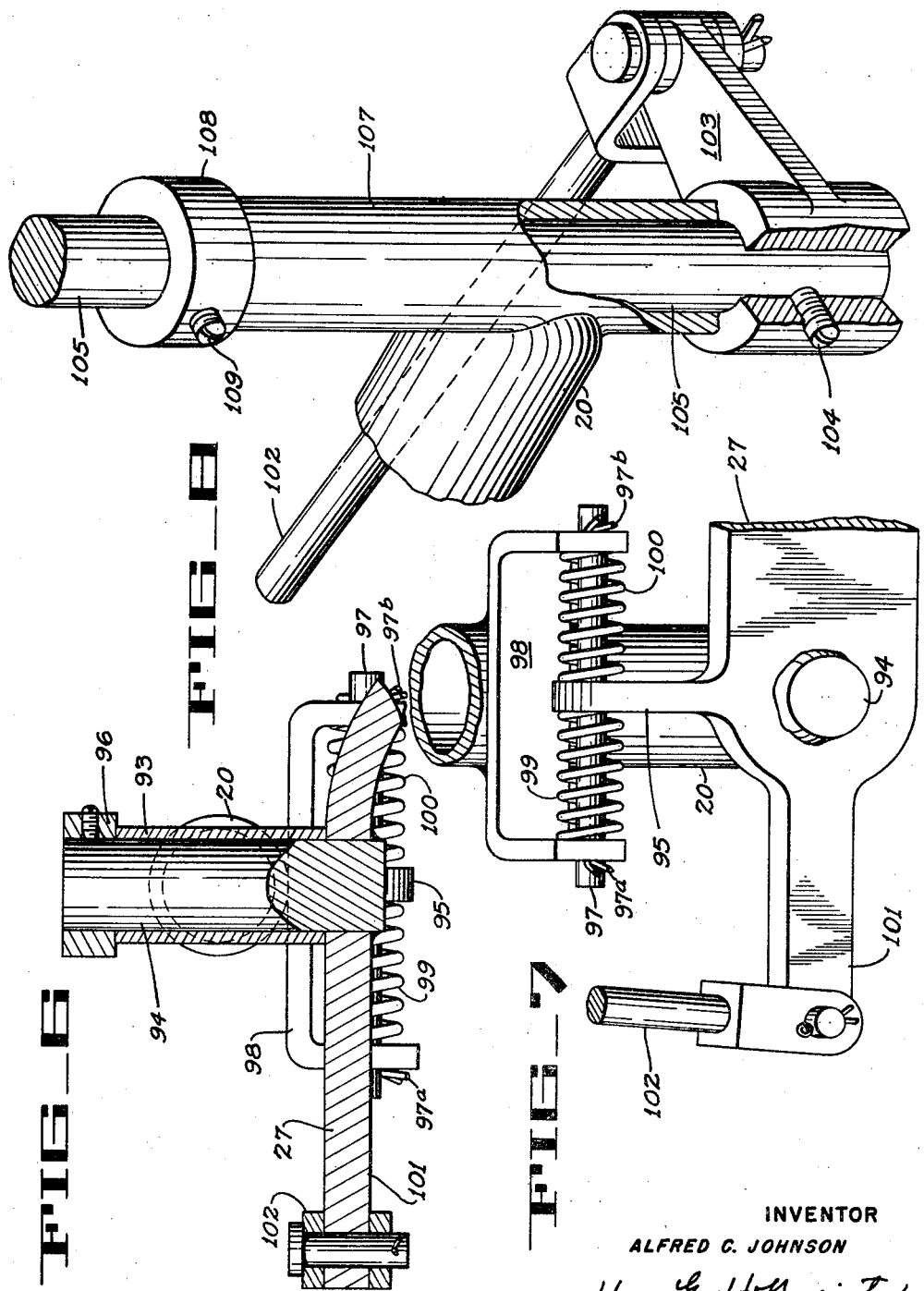

June 7, 1955  A. C. JOHNSON  2,710,069
DIRIGIBLE ARTICULATED FRAME GARDEN TRACTOR
Filed June 13, 1949  6 Sheets-Sheet 6
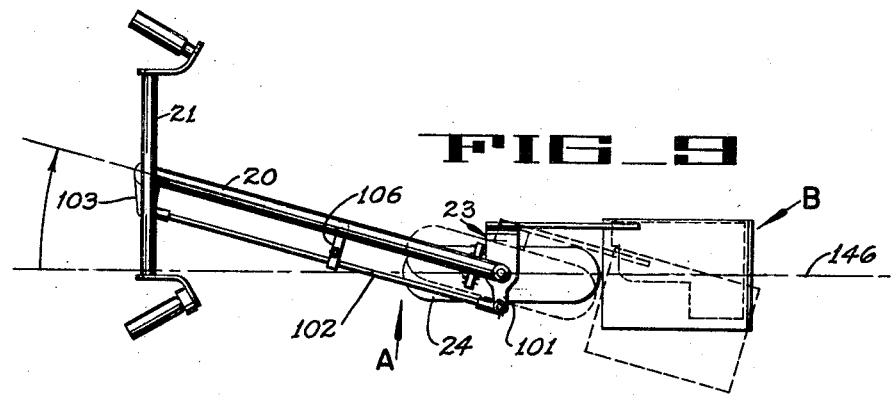
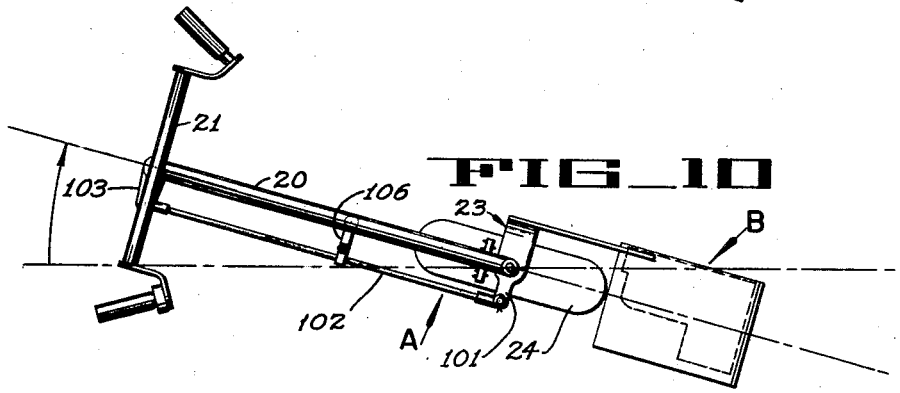
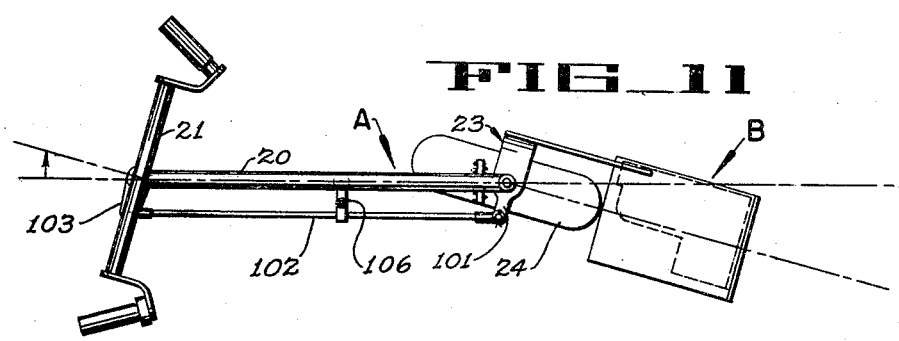
INVENTOR
ALFRED C. JOHNSON
BY Hans G. Hoffmeister
ATTORNEY

United States Patent Office 2,710,069
Patented June 7, 1955

2,710,069

DIRIGIBLE ARTICULATED FRAME GARDEN TRACTOR

Alfred C. Johnson, Winters, Calif.

Application June 13, 1949, Serial No. 98,787

8 Claims. (Cl. 180—19)

The present invention appertains to a tractor and relates more particularly to a single wheel garden or walking type tractor.

An object of the present invention is to provide an improved and simplified garden tractor.

Another object is to provide a single wheeled garden tractor with improved balance, control, and operating features.

Another object is to improve the steering and handling characteristics of a single wheeled garden tractor.

Another object is to provide improved resiliently cushioned steering facilities for a small single wheel garden tractor.

Another object is to improve the operation and power control of a garden tractor.

Another object is to provide an articulated-frame walking tractor and to provide for remote control of articulated portions of said frame for improved tractor manipulating and steering operations.

Another object is to provide improved steering and lawnmowing characteristics in a power driven garden device having a lawnmower attachment thereon.

Another object is to provide steering facilities for a single wheel tractor with a ground working tool thereon to steer a ground working tool while inserted in the ground and without raising the tool from ground working position.

These and other objects and advantages of the present invention will become apparent from the following description and drawing in which:

Fig. 1 is a perspective view of a garden tractor of the present invention with a lawn mower attachment mounted on the forward end thereof.

Fig. 2 is a plan view of the tractor and mower shown in Fig. 1.

Fig. 3 is a somewhat enlarged perspective view showing the other side of the tractor from that illustrated in Fig. 1, the lawn mower being replaced by a spring tooth cultivator attachment.

Fig. 4 is a further enlarged fragmentary elevation of the right hand side of the tractor engine assembly, portions thereof being broken away and other portions being shown in section.

Fig. 5 is a still further enlarged fragmentary section through a hand grip on the line 5—5 of Fig. 2.

Fig. 6 is a fragmentary section to the same scale as Fig. 5 taken on line 6—6 of Fig. 2.

Fig. 7 is a fragmentary bottom view showing an articulated frame arrangement and a portion of a spring pressed steering control device.

Fig. 8 is a fragmentary perspective view showing a rear end steering assembly, portions thereof being broken away.

Figs. 9, 10, and 11 are diagrammatic plan views in reduced scale illustrating remote steering and manipulating features of the articulated frame construction of the illustrated embodiment of the present invention.

Referring to the drawings, the tractor A comprises a three part articulated frame structure with pivotal connection between adjacent parts thereof. These three principal frame parts comprise, in addition to a central tubular manipulating or main frame portion 20, a handle bar 21 pivoted on the rear end, and a wheeled support frame 23 pivoted on the forward end thereof.

An implement hitch and counterweight support post 22 is connected as by welding to the manipulating frame portion 20 to extend downwardly therefrom. The terms "upwardly" and "downwardly" and terms of like import will be used in the specification and claims hereof to mean "when the tractor is in a generally upright position." An engine driven support and propulsion or traction wheel 24 is mounted on an axle 25 journaled in the forward frame 23, the entire forward assembly thus comprising a wheeled support pivotally connected to the main frame portion 20 for relative steering movement.

The pivoted forward frame 23 comprises an upright side member 27 of strong rigid metal, such as steel or Duralumin, with the wheel axle 25 journaled in the lower end thereof in a usual manner for cantilever wheel support. The rubber tired traction or drive wheel 24 is mounted on the axle 25 to rotate therewith. A forwardly and downwardly projecting frame member 28 is secured to the upright frame member 27, as by welding, and a horizontal engine support and skid plate 29, with up-curved forward end portion 30, is secured as by welding transversely beneath the forward end of the frame member 28. A usual fuel tank 31 is mounted forwardly of an engine B which is bolted securely to the plate 29. The engine may be of a usual air cooled type with a double V-grooved drive pulley 32 affixed to the projecting end portion of its shaft 33, Figs. 1, 2, and 4.

Power drive means from the engine to the traction wheel 24 comprise an inner V-belt 34 which passes around the inner groove of the engine drive pulley and also around a larger V-pulley 35 affixed to a stub shaft 37 journaled in the upper end of a tiltably mounted gear housing 38.

To provide releasable power drive connection between the engine and the traction wheel 24, the gear housing 38 is mounted to pivot on a reduced portion (not shown) of the outer end of a tubular shaft housing 39, which is connected at its other end, Figs. 2 and 3, as by welding, to a bracket 40 secured by bolts 41 to the downwardly and forwardly extending front frame member 28. A driving pinion 42 is keyed or otherwise secured to the stub shaft 37, and is in meshed driving engagement with a gear 43, Fig. 4, secured to rotate with a through shaft 44 journaled in the tubular housing 39.

For accomplishing forward and rearward tilting of the gear housing 38 about the axis of the shaft 44, and thereby to slacken or tighten the endless belt 34 as required, a belt control arm 45 is secured to the tiltable gear housing 38 to project upwardly therefrom. A coil spring 47 has one end thereof hooked into one of a plurality of holes 48 in the upper end of the arm 45, its other end being hooked into a hole in a bracket 49 gripped beneath one of the engine head bolts 50. The spring is held in tension between the lever and the bracket and thus tends normally to tilt the gear housing 38 forwardly, thereby reducing the distance between the axes of the engine shaft 33 and the stub shaft 37 and slackening the inner V-belt 34.

The upper end of the belt control arm 45 is connected by a link 60 and an operating cable 62 to a drum 65 on a right hand grip member 67. The operating cable passes rearwardly in guides 63 along the tractor manipulating frame 20, around an idler pulley 64, and, thence, is wrapped around the drum 65. Winding the cable on the drum by turning the hand grip draws the belt control lever rearwardly to tighten the belt 34. A spring latch 68 is mounted on a bracket 111 welded to one end of the handle bar 21 adjacent the hand grip 67, Figs. 2 and 4, and is adapted to enter a detent 69 provided in one flange of the drum to retain the drum against counter rotation.

For preventing the inner drive belt 34 from bowing outwardly when slackened, and thereby failing to release fully from driving engagement with the pulleys 32 and 35, a link 51 is connected between the lower end of the belt control arm 45, and the upwardly extending arm of a bell crank lever 53 pivoted on the engine. The ends of the link 51 are bent as at 46 and are inserted in holes in the belt control arm and bell crank lever, respectively. The bent end portions of the link are retained in their holes as by cotter pins 54, Fig. 4.

The other arm of the bell crank lever 53 has a curved, belt supporting extension arm 55 clamped in adjusted position thereto. A flattened portion 57 of the arm 55 is positioned directly beneath the lower run of the inner drive belt 34. When the gear housing 38 is tilted rearwardly, as shown in Fig. 4, to tighten the belt, this belt supporting arm 55 is swung downwardly clear of the belt by the link-connected bell crank lever 53. When the gear housing is tilted forwardly, however, under the action of the tension coil spring 47 to slacken the belt 34, the bell crank lever 53 will be swung by the link 51 to raise the flattened portion 57 into belt supporting position and thereby remove the sag which otherwise would occur in the lower run of the belt.

Upward bowing of the upper run of the belt when slackened is prevented by a curved belt restraining rod 58 mounted on the engine supporting plate 29, Figs. 1 and 4. A laterally extending upper end portion 59 of this restraining rod is positioned to overlie the upper run of the belt. The rod is adjusted vertically so that the portion 59 will just clear the upper run of the belt when tight, but will prevent it from bowing upwardly when the belt is slackened. The combined action of these two belt engaging members tends to elongate the belt when slackened and thereby to free the engine pulley from driving engagement therewith.

Driving transmission from the through shaft 44 to the drive wheel 24 is provided by a chain drive sprocket 70 secured to the other end of the shaft 44 from the gear 43. A drive chain 71 passes around the sprocket 70 and also around a driven sprocket 72 secured to the axle 25 of the wheel 24 to rotate therewith.

A lawn mower attachment C, Figs. 1 and 2, is removably attached, as by brackets 73, beneath the forward end of the engine mounting plate 29. The usual cylindrically arranged cutting blades 74 of the lawn mower have releasable rotative driving connection with the engine through an outer V-belt 75, Figs. 1, 2, and 4. The belt 75 passes around the outer V-groove of the engine pulley 32 and also around a larger V-pulley 76 secured to a stub shaft 77 journaled in the outer portion of a tilting gear housing 78. The housing 78 is pivoted on a shaft 79 in a manner generally similar to that described for the engine-to-wheel drive previously described herein. The shaft 79 is driven by a pinion 80 and gear 81 from the stub shaft 77. A chain drive sprocket 82 is mounted on the other end of the shaft 79 from the gear 81, and a drive chain 83 passes around this sprocket and around a mower blade drive sprocket 84, Fig. 2. As illustrated, the forward end of the mower attachment is supported from the engine mounting and skid plate 29 and, hence, no usual side mower wheels are required. Therefore, the mower blades can be brought into close endwise relation to trees and other objects in the manner of an edge mower.

Forward and rearward tilting of the gear housing 78 and the resultant tightening and loosening of the outer V-drive belt 75 is accomplished by an arm 84, secured to the gear housing 78 and controlled by a push-pull rod 85. The rear end of the rod 85 passes through a bracket 87 on the manipulating frame 20 having a notch of a size closely to receive the rod therein. A pair of collars 88 and 89 are secured in adjusted positions on the rod 85 to engage the bracket and thus secure the rod in endwise adjusted position. A retaining loop 90 is provided around the notch to prevent the rod from falling away from the bracket, the loop having an internal diameter sufficient to permit the collar 88 to pass therethrough.

For preventing the outer belt from bowing outwardly when slackened, a belt restraining hook 91 is carried by the belt tightener arm 84 and is positioned to depress the upper run of the belt when the gear housing is tilted forwardly to slacken the belt. This hook 91 swings upwardly to clear the belt when the gear housing is swung rearwardly to tighten the belt. A bracket 92 also is mounted on the lawnmower frame, Fig. 4, to underlie the lower run of the belt and limit its downward bowing tendency when slack.

The tractor frame 20 has pivotal steering connection with the forward wheeled support 23 by a tubular socket 93 on the forward end of the frame 20. This socket pivotally receives a pivot pin 94 welded to project upwardly from the transversely extending top portion of the wheel supporting forward frame member 27. The axis of the pin 94 is on a line intersecting the wheel axle 25 at substantially the midplane of the supporting wheel 24. A collar 96 on the upper end of the pivot pin retains it against downward displacement.

The forward wheeled support 23 is urged to a position wherein the plane of the wheel 24 is aligned with the main frame 20 by a spring pressed arm 95, Figs. 1, 3, and 7. This arm extends rearwardly from the top portion of the forward frame member 27 substantially in line with the vertical midplane of the supporting wheel 24. A spring positioning pin 97 is mounted to pass through a hole in the arm 95 near the rear end thereof, and also through holes in the downturned ends of a bracket 98 welded to extend transversely beneath the manipulating frame 20. The pin 97 is secured against endwise displacement by cotter pins 97a and 97b, Fig. 7. The hole in the rear end of the spring pressed arm 95 is elongated sufficiently to permit free pivotal steering movement of the forward frame 23 on its pivot pin 94 without interference between the sides of the hole and the spring supporting pin 97 therein.

The arm 95 is urged toward a central position between the ends of the bracket 98 by a pair of coil springs 99 and 100, which encircle the pin 97 and are held in compression between opposite sides of the arm 95 and the downturned ends of the bracket 98. These springs urge the arm 95, and thereby the forward wheeled support to which it is connected, toward a normally aligned position with the longitudinal axis of the manipulating frame 20.

Remote steering movement of the wheeled support by means of the handle bar 21 is accomplished through a steering arm 101 which extends laterally from the top of the vertical forward frame member 27, and a rearwardly extending steering link 102, Figs. 1, 2, 7, and 8. The steering arm 101 is connected by a steering link 102 to a lever arm 103 secured, as by a set screw 104, Fig. 8, to a steering post 105.

A steering link clamp 106, Figs. 1 and 2, is mounted on the bracket 87 on the main frame member 20. This clamp is adapted to be drawn into clamping engagement with the steering link 102 by a bolt 116 to lock the handle bar 21 and forward wheeled support 23 in pivotally adjusted positions.

The steering post 105 is mounted for pivotal steering movement in an upright tubular portion 107 on the rear end of the main frame 20, and projects upwardly beyond said tubular portion 107. The steering post is secured against downward displacement by a collar 108 and set screw 109.

The handle bar 21 is secured, as by welding, transversely across the top of the steering post 105. The pivoted right hand grip 67, previously described, and a second left hand grip 110 are mounted to pivot on brackets 111 and 112, respectively, welded one on each end of the handle bar 21.

The pivoted left hand grip 110 is connected, as by a usual Bowden wire control 113 attached along the manipulating frame 20 by clips 114, to a usual engine throttle control lever not shown.

The counterweight and implement support post 22 extends downwardly from the manipulating frame 20 rearwardly of the wheel 24. A counterweight support bracket 115 is secured in vertically adjusted position to the post 22 as by bolts 117, and has a forwardly extending arm 118 thereon to which a counterweight 119 is secured in adjusted position by a set screw 120. The counterweight may be of a weight substantially to balance the tractor about the wheel axle 25 as an axis. The counterweight preferably is adjusted in its lowest practical position without ground interference for each particular purpose for which the tractor is to be used. Such adjustment provides in each instance for the lowest practicable center of gravity of the tractor, and, therefore, tends toward easy balance and manipulation thereof.

An implement attaching bracket 121 is pivoted on a bolt 122 passing transversely through the lower end of the support bracket 115 and through the implement attaching bracket 121. The bracket 121 is adapted to be locked in pivotally adjusted position by a second bolt 123 inserted in a hole transversely of the bracket 115 and in arcuate slots 124 in the implement supporting bracket.

A downwardly opening channel member 125 is secured, as by welding, transversely across the lower end of the bracket 121 to receive upwardly extending positioning lugs 127, Fig. 3, of a pair of implement supporting arms 128 and 129. The arms 128 and 129 are secured to the bracket 121 by bolts 130. Cultivator teeth 131 are clamped to these arms in a usual manner.

A pair of forwardly extending angle side plates 132 and 133 are mounted one on each end of the channel member 125 and are connected to each other across their forward ends by a plate 134. A rolling colter 135 is journaled on the lower end of a vertical support member 137. The upper end of the member 137 is secured by a set screw 138 in vertically adjusted position on a forwardly extending spring pressed arm 139. The forward end of this arm 139 has a vertical bolt 140 therethrough, Fig. 3, the bolt also passing upwardly through a hole in the front bracket plate 134. A coil spring 141 is held in adjusted compression between the front plate 134 and a nut 142 on the bolt resiliently to resist downward displacement of the forward end of the arm 139. This permits spring controlled tilting action of the arm 139 about the channel member 125 as a fulcrum when the colter strikes an obstruction, such as a root or rock, in cutting through the ground.

Operation of the invention is as follows: Assuming that the engine B has been started and the lawn mower C is attached to the forward end of the engine bed plate 29, as shown in Figs. 1 and 2; the outer, or mower blade drive belt 75 is first tightened by grasping the rod 85, drawing it rearwardly, and hooking the lower collar 88 thereon over the notched bracket 87 as shown in Fig. 2. This tilts the gear housing 78 rearwardly raising the overlying hook 91 clear of the belt and drawing the belt taut. Tightening of the belt also raises the lower run of the belt clear of the lower bracket 92, and establishes a power driving connection between the mower blade 74 and the engine through the shaft 79 and drive chain 83, Figs. 2 and 3.

The tractor supporting and propelling wheel 24 then may be driven from the engine B by twisting the right hand grip 67 to draw the cable 62 and its connected belt tightener arm 45 rearwardly, thereby tilting the gear housing 38 and tightening the inner drive belt 34. Engine speed is controlled in a usual manner through the left hand grip 110 and Bowden wire control 113.

The steering arrangement, which comprises an important feature of the invention, permits great flexibility of operation and ease of manipulation for all operations within the capabilities of the tractor. It is well known to users of some garden tractors, especially those of the single wheel variety, that they heretofore have been difficult to steer and manipulate, particularly in performing ground working operations such as plowing and cultivating. Some of these garden tractors have been relatively top-heavy and extremely tiring to steer and operate even by a strong man.

To illustrate some of the steering features of the present invention, and the flexibility of operation attained thereby, attention is directed to Figs. 9, 10, and 11.

When the tractor A is used with an implement attached to its forward end, such as the lawn mower C, Figs. 1 and 2, it usually will be preferable to steer the tractor by swinging the rear end of the manipulating frame bodily from side to side thereby turning the entire tractor about the bottom of the supporting wheel 24 as a pivot. This type of steering is illustrated in Fig. 10. If the steering link clamp 106 is in released condition during such steering operations, the springs 99 and 100, through their action on the arm 95, tend to hold the forward wheeled support 23 in line with the manipulating frame 20. The coil springs then will absorb any sharp stresses from the forward pivoted frame assembly and will cushion their transmission to the manipulating frame, and, thence, to the operator. If desired, however, for this type of steering the wheeled support frame 23 can be locked against such resilient adjustment by tightening the steering link clamp 106 to hold the steering link 102 against relative longitudinal movement with respect to the main frame 20.

Plowing is a difficult operation with most small garden tractors, since the operator frequently must walk with one foot in the freshly plowed furrow. However, with the present invention, the handle bar 21 can be turned relatively to the manipulating frame 20, as shown in Fig. 9, and may be locked in that position by tightening the clamp 106. The operator then can walk along the land side of the furrow, grasping the handle bar grips which thus are offset toward the land side. The wheel runs in the previously turned furrow being guided along the land side thereof, and pointing generally straight ahead as along the line 146. The plow of a usual type, not shown, can be offset laterally from the vertical midplane of the wheel 24 toward the land side to turn the new furrow in a usual manner.

In other ground working opertions, such as cultivating, it is necessary to make frequent slight steering adjustments in order to keep the implements working close to the plants being cultivated. To accomplish such steering adjustments with an ordinary rigid frame walking tractor, the ground working implement must either be forced laterally through the ground where the ground is soft enough to permit it, or else the implement must be lifted clear of the ground and set over into the proper position. The latter is the procedure usually necessary, and its practice, in addition to requiring considerable muscular effort, leaves a short uncultivated portion in the row being cultivated since the tractor continues to advance during such setting over operation. Sometimes when the ground is not too hard a single wheel rigid frame walking tractor can be steered by tilting it to one side or the other like a wheel barrow. Such tilting, however, also tilts the attached implements and causes them to dig in to different depths on their opposite sides.

With my articulated and remotely steerable construction, when performing such ground working operations, the steering link clamp 106 should be loosened to free the steering link for free relative movement with respect to the main frame. The operator then can steer the tractor without forcing the implement laterally or lifting same out of ground, merely by turning the handle bar 21 to right or left to turn the forward wheeled support, as shown in Fig. 11. When turning pressure is released, the forward wheeled support and handle bar automatically are returned to their normal straight ahead positions by the action of the springs 99 and 100.

For lawn mowing, and other operations wherein the tractor and its attachments work on top of the ground, the counterweight 119 usually can be adjusted to a very low position without danger of ground interference. In plowing, cultivating, or similar ground working operations, however, where the support and propulsion wheel and attachments operate at a lower level than is the case with the lawn mower attachment, the counterweight 119 should be raised sufficiently to insure its clearing the ground and then locked in such position by the set screw 120.

The engine mounting plate 29, in addition to protecting the engine and associated parts from impact and possible injury by objects projecting upwardly from the ground, also provides a broad supporting or skid surface for the tractor itself in case the supporting wheel should tend to bog down. In such case, the weight of the tractor can be partially supported by the plate 29 as a skid, and the frame manipulated to take part of the tractor weight off the wheel 24. Thus, the tractor can be manipulated and caused to drive itself out of almost any difficult situation which may be encountered in soft, wet, or sandy soil.

The low and adjustable center of gravity of the present tractor and the excellence of its balance both laterally and fore and aft, together with its ease of steering and manipulation under all working conditions, make it so easy to operate that it does not require much strength or physical exertion even for performing the heaviest jobs of which it is capable.

While I have shown representative front and rear mounted implements on the tractor, it will be understood by those familiar with the art that numerous other implements and devices can be mounted on or attached to the tractor either for pushing or drawing. Also, while I have shown and described a presently preferred form of the invention, it is, of course, susceptible of several modifications which will become apparent to one of ordinary mechanical ability when using the invention. It is desired, therefore, not to limit the invention except as defined in the following claims.

I claim:

1. A walking tractor comprising a main frame, a handle bar pivotally mounted on an end of said main frame for pivotal movement about an upright axis, a forward wheeled frame pivotally connected to the main frame for steering movement about an axis substantially parallel to that of the handle bar, a propulsion and support wheel mounted in an upright plane in said wheeled frame, means operatively interconnecting the handle bar and the wheel frame for coordinated pivotal movement, the handle bar being maintained thereby substantially at right angles to the plane of the wheel, means normally urging the handle bar to a position at right angles to the longitudinal axis of the main frame, and power drive means mounted on one of said frames and having power driving connection with said wheel.

2. A walking tractor comprising a longitudinally disposed frame, a pair of vertical bearing sleeves secured one on each end of the frame, a steering post mounted for pivotal movement in one of said sleeves, a handle bar mounted on said steering post to extend laterally therefrom, a lever arm secured to said steering post to extend at right angles to the pivotal axis thereof, a link pivoted on one end of said arm to extend therefrom along said frame, clamp means carried by said frame and adapted to clamp said link in adjusted position against longitudinal movement relatively to the frame, a wheeled support, a pivot thereon pivotally mounted in the other of said sleeves pivotally to connect the wheeled support to said frame, the other end of said link being pivoted in a portion of said wheeled support offset from its axis of pivotal mounting to transmit pivotal steering movement from said handle bar to said wheeled support, and power drive means mounted on said tractor and having propulsive driving connection with said wheeled support.

3. A walking tractor comprising a longitudinally extending main frame, a handle pivoted on the rear end thereof about an upright axis for pivotal movement of said handle and manual support and manipulation of the rear end of said frame, a steering arm secured to said handle to pivot therewith, a wheel support frame pivoted for steering movement on the forward end of the main frame, a support and propulsion wheel mounted rotatably on the wheel support frame, a spring biased arm on the wheel support frame, a bracket secured on the main frame to have portions thereof disposed on opposite sides of said arm, a pair of springs mounted in compression between said bracket portions and opposite sides of said arm normally to urge said arm to a position midway between said bracket portions with the plane of the wheel in line with the longitudinal axis of the main frame, a steering arm mounted on said wheel support frame to extend laterally therefrom with the wheel thus in line, a link connecting the steering arm of said wheel support frame to the steering arm of said handle for coordinated pivotal steering movement between the handle and the wheel frame, an engine mounted on the wheel support frame forwardly of the wheel, and drive means adapted to interconnect the engine and the wheel for power propulsive rotation thereof.

4. A walking tractor comprising an elongated main frame, a handle with laterally separated hand grip portions pivoted about an upright axis on the rear of said frame, a wheel support frame pivoted for steering movement on the front of said main frame, motion transmitting means operatively interconnecting the handle and wheel support frame for coordinated pivotal movement, means for releasably locking the handle and wheel support frame in pivotally adjusted position, spring means mounted normally to urge the pivoted wheel support frame toward a straight ahead steering position, a support and propulsion wheel mounted rotatably on the wheel support frame, an engine support and skid plate mounted on said wheel support frame to extend forwardly from the forward side of said wheel and parallel to the axis of wheel rotation to be disposed substantially horizontally during normal tractor operation, an engine having a drive pulley thereon mounted on said plate for partially balancing the main frame about the wheel axis as a fulcrum, and power transmission means operatively connecting the engine drive pulley and the wheel for propulsive rotation of said wheel, said power transmission means including a drive belt and means for tightening and loosening said belt.

5. An arrangement as set forth in claim 4 wherein the engine and its supporting plate are mounted at a low elevation thereby to provide a tractor with low center of gravity.

6. A walking tractor comprising a main frame, a steering member mounted thereon for pivotal movement about an essentially vertical axis, a forward frame pivotally connected to said main frame for steering movement about an axis substantially parallel to that of said steering member, traction means including a power unit mounted from said forward frame, a steering link operatively interconnecting the steering member and the forward frame for coordinated pivotal movement while maintaining said steering link in parallelism with said main frame, and means normally urging the steering member to a position at right angles to the longitudinal axis of the main frame.

7. A walking tractor comprising a main frame, a steering member mounted thereon for pivotal movement about an essentially vertical axis, a forward frame pivotally connected to said main frame for steering movement about an axis substantially parallel to that of said steering member, a running gear including a power unit mounted from said forward frame for supporting and propelling the same, a steering link operatively interconnecting the steering member and the forward frame for coordinated pivotal movement while maintaining said steering link in parallelism with said main frame, and means for releasably locking the steering member and the forward frame in any selected pivotally adjusted position.

8. A walking tractor comprising a main frame, a steering member mounted thereon for pivotal movement about an essentially vertical axis, a forward frame pivotally connected to said main frame for steering movement about an axis substantially parallel to that of said steering member, means mounted from said forward frame for supporting and propelling the same, a steering link operatively interconnecting the steering member and the forward frame for coordinated pivotal movement while maintaining said steering link in parallelism with said main frame, and means for selectively clamping the main frame and the steering link against relative movement therebetween, thereby to releasably lock the steering member and the forward frame in any desired pivotally adjusted position.

References Cited in the file of this patent

UNITED STATES PATENTS

| Number | Name | Date |
|---|---|---|
| 417,109 | Speck | Dec. 10, 1889 |
| 544,051 | Redmond et al. | Aug. 6, 1895 |
| 565,718 | Boardman | Aug. 11, 1896 |
| 1,306,483 | Hino | June 10, 1919 |
| 1,307,327 | Van Nort | June 17, 1919 |
| 1,477,398 | Valentine et al. | Dec. 11, 1923 |
| 2,151,117 | Kepler | Mar. 21, 1939 |
| 2,211,260 | Donald | Aug. 13, 1940 |
| 2,256,583 | Squires | Sept. 23, 1941 |
| 2,282,837 | Wahrenbrock | May 12, 1942 |
| 2,374,533 | Fulton | Apr. 24, 1945 |
| 2,401,796 | Raitch | June 11, 1946 |
| 2,457,821 | Johnson | Jan. 4, 1949 |
| 2,477,945 | Simpkins | Aug. 2, 1949 |
| 2,523,171 | Willey | Sept. 19, 1950 |
| 2,530,941 | Devirian | Nov. 21, 1950 |

FOREIGN PATENTS

| Number | Country | Date |
|---|---|---|
| 9,104 | Great Britain | Aug. 30, 1890 |
| 213,241 | Great Britain | Nov. 20, 1924 |
| 773,328 | France | Sept. 3, 1934 |